Patented Sept. 8, 1925.

1,552,820

UNITED STATES PATENT OFFICE.

SIDNEY M. CADWELL, OF LEONIA, NEW JERSEY, ASSIGNOR TO THE NAUGATUCK CHEMICAL COMPANY, OF NAUGATUCK, CONNECTICUT, A CORPORATION OF CONNECTICUT.

PROCESS FOR VULCANIZING RUBBER AND SIMILAR MATERIALS AND PRODUCTS OBTAINED THEREBY.

No Drawing. Application filed November 22, 1923. Serial No. 676,353.

*To all whom it may concern:*

Be it known that I, SIDNEY M. CADWELL, a citizen of the United States, residing in Leonia, county of Bergen, State of New Jersey, have invented certain new and useful Improvements in Processes for Vulcanizing Rubber and Similar Materials and Products Obtained Thereby, of which the following is a full, clear, and exact description.

This invention relates to vulcanizing rubber and similar materials and products obtained thereby.

This application is a continuation in part of my copending application Serial No. 548,829, filed April 1, 1922.

The principal object of the present invention is to provide a relatively inexpensive material which may be used with oxides of lead to accelerate the vulcanization of rubber, particularly litharge as it is employed in so-called mechanical rubber goods, which usually contain rather large amounts of compounding ingredients.

The invention accordingly comprises a process of vulcanizing rubber or similar material which includes combining rubber with sulphur, lead dithiobenzoate and an oxide of lead, and vulcanizing the rubber.

In carrying out the invention in its preferred form, 100 parts of rubber, 5 parts of litharge, 3 parts of sulphur and 4 parts of a mixture of 1 part of lead dithiobenzoate and 63 parts of a clay (mineral flour) suitable for rubber compounding or similar rubber filler are mixed by milling in the usual manner. This compound is then vulcanized for 45 minutes at approximately 286° F. Vulcanization temperatures within the normal range of hot vulcanization temperature, above 240° F. may be employed.

Lead dithiobenzoate may be prepared by the method of J. Houben described in Berichte der Deutscher Chemischen Gesellschaft, vol. 39, page 3219 with the modification that acetic acid is employed to neutralize the excess of sodium bicarbonate in the aqueous solution of sodium dithiobenzoate prepared according to the procedure of Houben. The lead dithiobenzoate is then precipitated by treating the solution with an aqueous solution of lead acetate. Lead dithiobenzoate is a stable chemical. The mixture of this material with clay or similar compounding ingredient may be carried out in any desired manner.

The vulcanization process described above is more rapid and the vulcanizate secured in accordance therewith is of better quality than is obtained when litharge alone is employed. The mixture of litharge and lead dithiobenzoate may be mixed by milling at the usual milling temperature with substantially no danger of prevulcanization. The material is a relatively inexpensive one.

Having thus described my invention, what I claim and desire to protect by Letters Patent is:

1. A process of vulcanizing rubber or similar material which comprises combining rubber with sulphur, lead dithiobenzoate, and an oxide of lead, and vulcanizing the rubber.

2. A process of vulcanizing rubber or similar material which comprises combining rubber with sulphur, lead dithiobenzoate, litharge and a filler, and vulcanizing the rubber at normal hot vulcanization temperature.

3. A process of vulcanizing rubber or similar material which comprises combining with rubber approximately 3 parts by weight of sulphur, 4 parts by weight of a mixture of 1 part of lead dithiobenzoate and 63 parts of clay, 5 parts by weight of litharge, and vulcanizing the rubber.

4. Vulcanized rubber derived from rubber combined with sulphur, lead dithiobenzoate and litharge.

5. Vulcanized rubber derived from rubber combined with sulphur, lead dithiobenzoate, litharge and a filler.

Signed at New York, county and State of New York, this 20th day of November, 1923.

SIDNEY M. CADWELL.